US012757102B2

(12) United States Patent
Shivakumar

(10) Patent No.: US 12,757,102 B2
(45) Date of Patent: Oct. 6, 2026

(54) ZTP RAN SERVER WITH A VIRTUAL CELL SITE ROUTER

(71) Applicant: Mavenir Systems, Inc., Richardson, TX (US)

(72) Inventor: Chetan Kumar Shivakumar, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 317 days.

(21) Appl. No.: 18/658,223

(22) Filed: May 8, 2024

(65) Prior Publication Data

US 2024/0381221 A1 Nov. 14, 2024

(30) Foreign Application Priority Data

May 10, 2023 (IN) ............................ 202321033142

(51) Int. Cl.
*H04W 40/24* (2009.01)
*H04L 41/0806* (2022.01)
*H04L 41/40* (2022.01)

(52) U.S. Cl.
CPC ....... *H04W 40/248* (2013.01); *H04L 41/0806* (2013.01); *H04L 41/40* (2022.05)

(58) Field of Classification Search
CPC ... H04W 40/248; H04L 41/0806; H04L 41/40
See application file for complete search history.

(56) References Cited

U.S. PATENT DOCUMENTS

| | | | | |
|---|---|---|---|---|
| 12,432,116 | B2 * | 9/2025 | Cuavas | H04L 41/0895 |
| 2017/0063808 | A1 | 3/2017 | Manapragada et al. | |
| 2022/0014541 | A1 * | 1/2022 | Manser | H04L 63/1433 |
| 2022/0131891 | A1 * | 4/2022 | Manser | H04L 63/1416 |
| 2022/0279420 | A1 * | 9/2022 | Akkipeddi | H04L 45/741 |
| 2023/0041806 | A1 | 2/2023 | Singh | |
| 2024/0422107 | A1 * | 12/2024 | Sharma | H04L 41/0806 |
| 2025/0097111 | A1 * | 3/2025 | Cuavas | H04L 41/0895 |
| 2025/0097821 | A1 * | 3/2025 | Akkipeddi | H04L 45/04 |

OTHER PUBLICATIONS

Extended European search report for corresponding European patent application EP24175194.0, 12 pages, dated Sep. 20, 2024.
Borromeo et al."FPGA-accelerated SmartNIC for supporting 5G virtualized Radio Access Network", Computer Networks, 210; Mar. 31, 2022, Elsevier B.V., Amsterdam, The Netherlands.

* cited by examiner

*Primary Examiner* — Abdullahi Ahmed
(74) *Attorney, Agent, or Firm* — Ruggiero McAllister McMahon LLC

(57) ABSTRACT

A zero-touch provision Radio Access Network Distributed Unit (DU) server for a remote cell site that uses a Network Interface Card (NIC) to function temporarily as a Cell Site Router (CSR) to establish a connection with a central database to download BIOS/Operating System to boot the DU server, wherein once the DU server is booted, software executes that boots up a virtual CSR (vCSR). Once the vCSR is up and running, the vCSR reprograms the NIC to perform offloading networking tasks from the DU server CPU to a network processing unit (NPU) on the NIC. The NPU is designed to handle networking tasks such as packet encryption, packet classification, packet filtering, load balancing, and security features.

12 Claims, 5 Drawing Sheets

ZTP RAN SERVER WITH A VIRTUAL CELL SITE ROUTER

CROSS REFERENCE TO RELATED APPLICATIONS

This application claims benefit under 35 USC § 119 of India application No. 202321033142 filed May 10, 2023, the entire contents of which are incorporated herein by reference.

BACKGROUND

1. Field of the Invention

The present disclosure is related to the operation of equipment at remote cell sites. More particularly, the present disclosure is related to reducing the number of separate pieces of equipment needed at a remote cell site, automatically configuring equipment at the cell site and reducing the overall power used by that equipment.

2. Description of Related Art

Remote cell sites for mobile phones have been in use for many years. These remote sites include various equipment, however, 5G networks have two major components the Radio Access Network (RAN) and the core network. The RAN typically comprises three major components, which include the Remote Radio Unit (RRU), the Distributed Unit (DU) and the Central Unit (CU). The mid-haul network connects the DU server to the CU server and the back-haul network connects the CU server to the core network. DU server and the RRU are typically co-located at the cell site of a 5G network. The CU server and the core network are co-located in the data center. Another architecture is the CU server located at an aggregation point and the aggregation point connects to the core network at the data center.

An additional piece of equipment that is used at remote cell sites is a Cell Site Router (CSR). The CSR is coupled to the DU server and allows the DU server to establish a connection with a central location via a network connection. The CSR routes the traffic from the DU server towards the CU server over the mid-haul network. A mid-haul network can be a public Wide Area Network (WAN) or a leased line connection over the WAN.

A challenge faced by remote cell sites is that equipment that is physically placed at the remote cell site must be powered. The more equipment that is located at a remote cell site, the more power that remote site needs to operate the local equipment. Another challenge is that these remote cell sites often have very limited space. As such, the more equipment used at a remote cell site the more difficult it is to provide space for additional equipment that may be needed for upgrading or expanded functionality. Further, each piece of equipment located at a remote site must be provided with protection against voltage spikes and surges. In short, each additional piece of equipment placed at a remote cell site increases the set up and operational cost of each remote cell site. Communication Service Providers (CSPs) have seen their networks' total cost of ownership (TCO) increase on a per-cell basis with the introduction of 5G, edge computing and RAN densification.

Still another challenge with remote cell sites relates to the remote physical locations for these sites. When problems arise, historically individuals would have to travel out to the location to fix the problem. Likewise, when new configurations or upgrades or maintenance was needed, travel out to these remote locations was time-consuming and costly.

In more recent years, Zero Touch Provisioning (ZTP) has been provided where there is no local qualified staff at the cell site. ZTP of the DU server includes pushing new Basic Input/Output System (BIOS) configs, bringing up the bare metal Operating System (OS), and installing cluster software and DU application.

For ZTP to function, typically the Baseboard Management Controller (BMC) on the server must have reachability to the central or local data center computer(s). To accomplish this, a cell site router is located at each remote cell site and provides the network connectivity for the DU server to reach the data center. It should be noted that, while the whole 5G stack is virtualized in the cloud, every remote cell site requires a conventional hardware-based router, the cell site router (CSR), to connect the different elements/equipment back to the data center. Unfortunately, the CSR router uses rack space, needs to be commissioned, deployed, and managed and requires electrical power to operate.

New systems have been provided including, for example, Network Function Virtualization (NFV), which provides for network functions such as routing, firewall or load-balancing that can be accomplished with virtual devices known as Virtual Network Function (VNF). See, https://iceexplore.iccc.org/document/8985505; 2019 IEEE 13th International Conference on Telecommunication Systems, Services, and Applications (TSSA). It is contemplated that this technology could be applied to remote cell sites to address some of the previously listed problems.

A virtual Cell Site Router (vCSR) is a software router that provides virtualized network functions. The vCSR replaces a physical router in a cellular network, that brings advantages like reduced complexity, reduced cabling, reduced power requirement, and reduced total cost of ownership. In most common deployments the vCSR runs as a CNF/VNF (Cloud-Native Network Function/Virtual Network Function) functions on the physical server at the cell site. The server also hosts RAN DU CNF software. The DU software connects to the CU server, which is remotely located with the help of the vCSR. Like a physical CSR, a vCSR routes the packets from the DU server to the CU server over the mid-haul network. The mid-haul link now directly terminates on the physical server. The vCSR, supports features like IPSEC and VPN to provide a secure and isolation of traffic carried towards the CU server. The CSR uses a smart NIC to offload complex cryptographic functions.

A vCSR would encompass a CNF or VNF router developed as software that could run on the DU server sharing the Central Processing Unit (CPU) cores and memory on the DU server. However, a problem with this application arises specific to remote cell site locations. For the vCSR to function, the DU must be running at minimum the operating system on the bare metal server and optimally the container runtime and the custom software. This however, creates a catch-22 in that, for the DU server to boot or come up, the DU server needs network reachability with the central or local data center computer(s), which requires the CSR to be up and running.

In the context of 5G RAN, the DU application is responsible for performing various signal processing functions such as beamforming, modulation and demodulation, as well as radio resource management. The DU application runs as a CNF/VNF and sends the packets to the CU server via a CSR. The DU application performs real-time functions and may use a smart NIC to offload some of the signal processing functions.

When the physical server is powered on for the first time, the BIOS settings would cause the server to initiate a network boot. In this mode, the server will connect to the datacenter and download the boot configs, OS images, application images, application config etc.

After a successful download the DU server boots up the operating system with the downloaded data and configures itself with the downloaded configuration file. After the OS boots up, the VM or the container services starts. After this occurs, a vCSR would boot up and start functioning as a router. In parallel the DU applications also begin. In a cell site with a physical CSR, while the DU server is powered on, the CSR is also powered on. Once the CSR boots up and starts functioning, it will be capable of routing packets to the central datacenter. The DU server uses this link to connect and download the OS and application images and config files.

However, when the cell site router is virtualized and deployed inside the DU server there is no external device to establish the reachability network to the central location. In other words, the DU server cannot be bootstrapped without the network connection. In the absence of CSR, there is no connectivity to a central datacenter. When the CSR is a virtualized function running on DU server, the DU server can't reach the datacenter to download OS data.

Accordingly, there is a need for a remote cell site system configuration that overcomes, alleviates, and/or mitigates one or more of the aforementioned and other deleterious effects of prior art systems but at the same time, overcomes the catch-22 issue that a DU server at a remote cell site faces when using a vCSR.

SUMMARY

Accordingly, what is desired is a system and method for managing a remote cell site that minimizes the number of different pieces of equipment that are required to be installed at the remote cell site.

It is further desired to provide a system and method that minimizes the total amount of space and electricity used by equipment that is installed at a remote cell site.

It is still further desired to provide a system and method that allows for ZTP of a DU server installed at a remote cell site and eliminates the need for a physically separate CSR.

Finally, it is desired to provide a system and method for controlling a remote cell site with a DU server that includes a vCSR comprising a cloud-native or VNF router that runs as software on the DU server sharing the CPU cores and memory on the DU server, but avoids the catch-22 issued described previously.

In one configuration, the DU server typically houses a smart Network Interface Card (NIC), which is used to offload signal processing, or Internet Protocol Security (IPSec) encryption offloading as per the design. The offloading functions on these NIC cards are typically implemented in a Field Programmable Gate Array (FPGA). The nature of a FPGA allows for the devices to be programmed allowing the card to function as a smart NIC. This means that they can be reprogrammed in the field as and when necessary. The NIC can therefore be programmed to function as a minimal vCSR to facilitate the ZTP process and subsequently repurpose the NIC to function as an offload engine.

In a proposed solution, minimal routing functions are programmed into the smart NIC. When the DU server is powered on, the NIC is also powered on. The smart NIC starts booting up minimal routing functions and starts functioning as a router. In the meantime, the DU server begins downloading the BIOS configs and/or OS data from the central datacenter. The minimal routing function running on the smart NIC provides connectivity with the central datacenter. Once all the required data and configs are downloaded, the DU server boots up to operational mode. Subsequently the container/virtualization services are started on the DU server. Followed by this the vCSR and DU applications boot up and reach an operational state. At this point, the vCSR running on the DU server triggers the smart NIC to stop routing functions. Based on the intended functionality of the smart NIC, the IPSEC offloading functions, or any other offloading functions are loaded to the smart NIC.

Subsequent boot ups will be normal OS bootup followed by container/virtualization services, followed by vCSR and DU applications. In this operation mode, the vCSR provides connectivity to the central datacenter by routing the traffic.

In this configuration, the smart NIC may be provided with two states. In state one: When a smart NIC, along with the DU server, is shipped to the cell site location, the smart NIC runs a minimal router functionality that is required to bring up the network infrastructure at the cell site location. In state two: once the DU server is up and vCSR application starts on the DU server, the vCSR will reprogram a smart NIC to provide assisted acceleration like encryption for IPsec or any other offloading. Accordingly, the vCSR replaces the physical cell site router with a cloud-native network function (CNF) running on the open DU server.

For this application, the following definitions shall apply:

A "smart NIC" (Network Interface Card) is a type of network adapter that offloads networking tasks from a CPU to a dedicated processor on the NIC. This dedicated processor, often called a network processing unit (NPU), is designed to handle networking tasks such as packet classification, packet filtering, load balancing, and security features.

A "bare metal" server is a physical server with a CPU, memory, and disk to run applications on top of it. The qualifier bare metal came into existence to differentiate it from virtual servers. The virtual server doesn't have a physical form factor and it is a common use case to run multiple virtual servers on a single bare metal server.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration a method for booting up a Distributed Unit (DU) server located at a cell site location is provided, the DU server connected to network infrastructure at the cell site location where the method comprises the steps of: providing a programmable Network Interface Card (NIC) connectable to a network to establish router functionality in the DU server, wherein the NIC is provided for facilitating a connection between the DU server and a remote computer via the network, and where the DU server and the NIC are powered up, the DU server initializes the network infrastructure at the cell site location and the NIC operates as a router to provide a connection between the DU server and the remote computer via the network. The method is further provided such that the DU server executes software saved on a storage accessible by the DU server, the software comprising a virtual Cell Site Router (vCSR), where the vCSR establishing a connection between the DU server and the remote computer. Finally, the method is provided such that after the vCSR has taken over router functions for the DU server, software executes on the DU server reprograming the NIC to provide assisted acceleration for Internet Protocol Security (IPSec) encryption or signal processing offloading by the NIC or both.

In another configuration a system for booting up equipment at a cell site location is provided, where the system comprises: a Distributed Unit (DU) server connected to a storage and to network infrastructure at the cell site location, and a programmable Network Interface Card (NIC) connected to the DU server and connectable to a network. The system is provided such that when the DU server and the NIC are powered up, the DU server initializes the network infrastructure at the cell site location and the vCSR establishes a connection between the DU server and a remote computer via the network. The system is further provided such that software executes on the DU server comprising a virtual Cell Site Router (vCSR) that establishes a connection between the DU server and the remote computer via the network. The NIC provides assisted acceleration for Internet Protocol Security (IPSec) encryption or signal processing offloading by the NIC or both.

The above-described and other features and advantages of the present disclosure will be appreciated and understood by those skilled in the art from the following detailed description, drawings, and appended claims.

DETAILED DESCRIPTION

Figure 1:
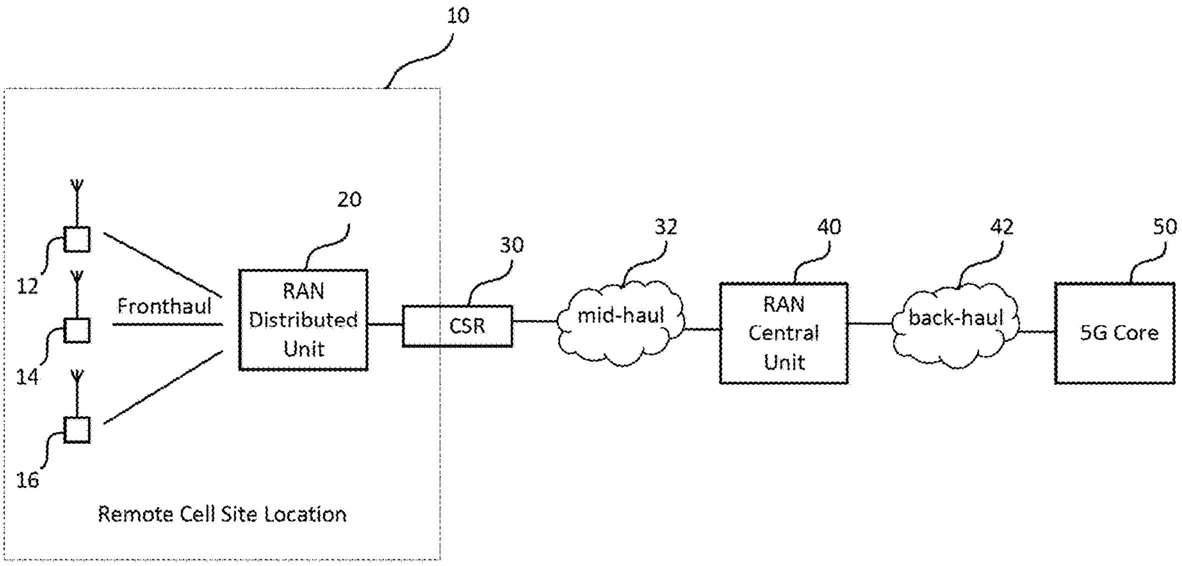
FIG. 1 is a diagram illustrating the various equipment used in a cell site location along with the connection to various control equipment used for telecommunications systems.

Referring to the drawings and in particular to FIG. 1, a remote cell site location 10 is illustrated by a dashed line. At the remote cell site location 10 a RAN DU server 20 is provided along with a CSR 30. The CSR 30 allows the RAN DU server 20 to communicate with RAN CU server 40 via mid-haul connection 32. Mid-haul connection 32 can be a public Wide Area Network (WAN) or a leased line connection over the WAN. The RAN CU server 40 communicates with 5G Core equipment 50 via back-haul connection 42.

The RAN DU server at remote cell site 10 communicates with Remote Radio Units (RRUs) 12, 14, 16 over an ECPRI interface or over a wired interface. It should be noted that while three RRUs are illustrated, additional RRUs may be connected to RAN DU server.

Figure 2:
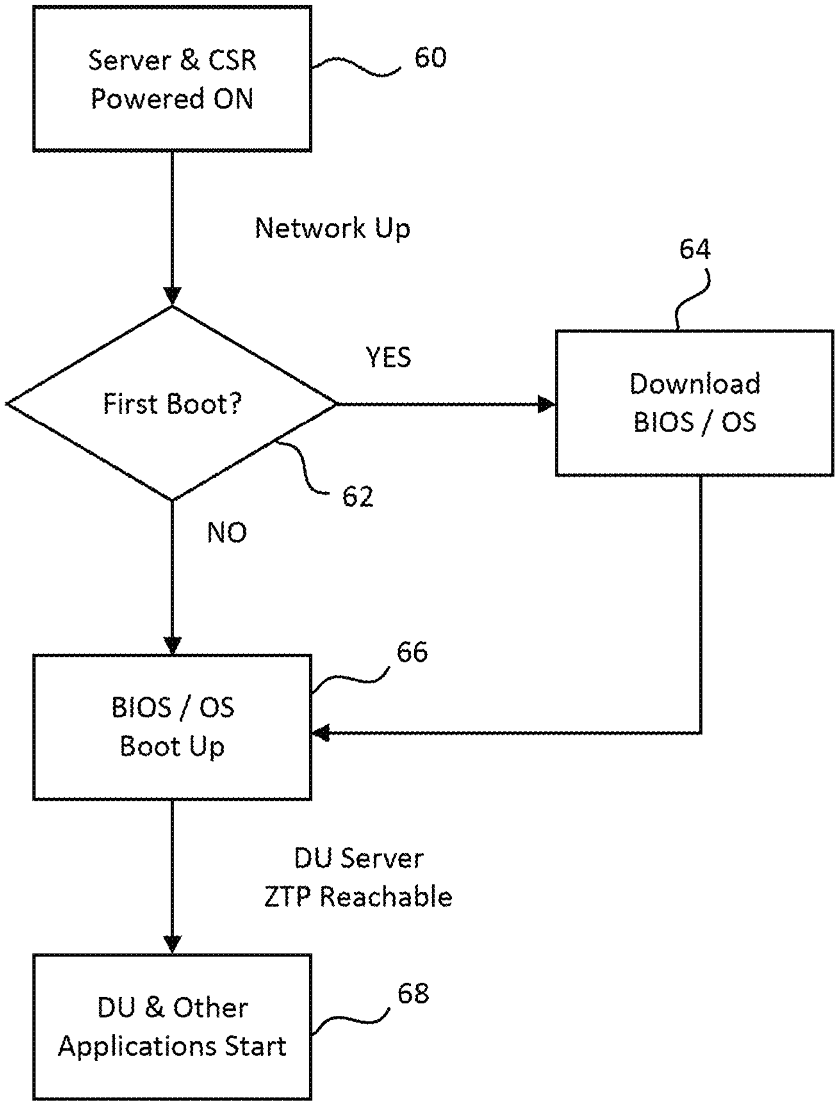
Prior Art FIG. 2
FIG. 2 is a flow diagram of a cell site boot up process using a CSR as is known in the art.

Referring now to FIG. 2, a sample boot up process is described for a remote cell site DU server. As is known in the prior art, once power is turned on 60 to RAN DU server at remote cell site, the RAN DU server and the CSR power up. The CSR powering up allows for the DU server to establish a network connection.

At initial boot up 62, if the DU server has not booted previously, the CSR allows the DU server to Download BIOS, OS Application software & Configs 64. Once the BIOS/OS is downloaded or saved on the DU server, the BIOS/OS is booted 66 on the DU server. At this point, the RAN DU server and other applications can start and allowing the RAN DU server to function and communicate with the RRUs and the and RAN CU server.

Figure 3:
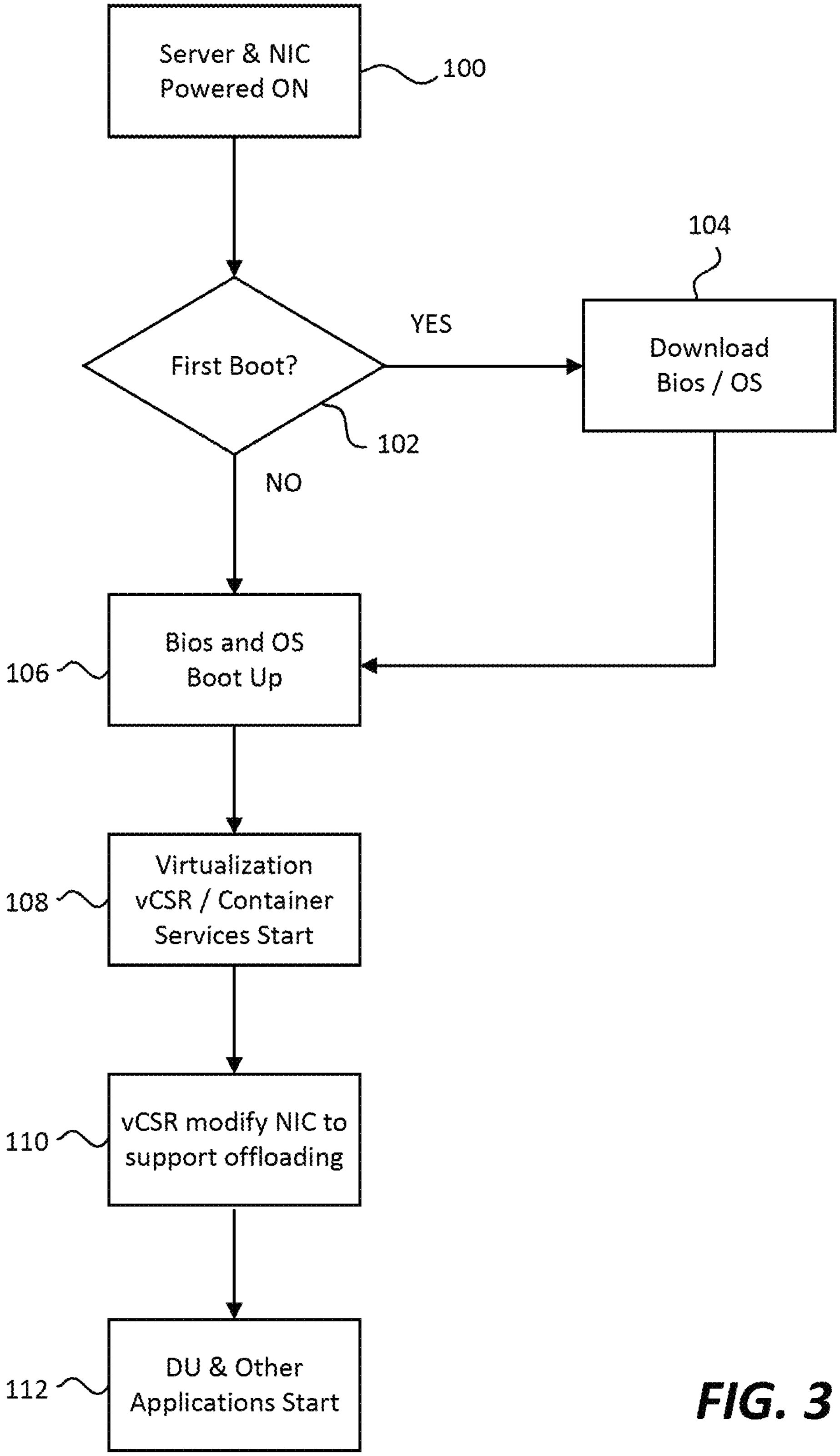
FIG. 3 is a flow diagram of a cell site boot up process using a ZTP RAN server with a vCSR according to the invention.

The process for using a virtual CSR and leveraging a NIC to temporarily assist in the establishment of a network connection is described in connection with FIG. 3.

It should be noted that smart NICs are used in high-performance computing and data center environments, where they can help to reduce CPU overhead and improve network performance by offloading networking tasks to the NIC. By offloading these tasks, the CPU is freed up to focus on other tasks, such as running applications or processing data. However, smart NICs can also be used to implement advanced networking features such as virtualization and software-defined networking (SDN), as well as to provide hardware-level security and encryption for network traffic.

As was stated previously, a fundamental problem with using a vCSR is that if the RAN DU server has not booted and does not have the BIOS/OS downloaded, the RAN DU server is not able to run the vCSR. If the vCSR is not running, a network connection can't be established with the RAN CU server creating a catch-22 situation. Accordingly, to create a network connection, a NIC is temporarily used to establish a minimal network connection that would allow the RAN DU server to download and receive at a minimum the BIOS/OS needed to run the RAN DU server, which in turn, would allow the RAN DU server to boot the vCSR to establish a regular network connection with the RAN CU server.

Accordingly, in FIG. 3 the new boot-up sequence is as follows.

The RAN DU server including the NIC are powered on 100. The system will then look to see if this is the first boot 102 by determining if the BIOS/OS are present on the RAN DU server. As soon as the RAN DU server is powered up the NIC card is also powered and the basic CSR on the NIC starts booting. The moment the basic CSR on the NIC is up it establishes a network to the data center allowing the RAN DU server to 104. Once the network is ready the RAN DU server ZTP process starts, which includes the BIOS configs download for the bare metal OS install 106.

Once the RAN DU server is up the virtualization container services and vCSR start 108. Next, the vCSR router will then upgrade the NIC card FPGA to support the standard NIC offloading functions 100. These functions could include, but are not limited to, IPSec encryption or signal processing. Subsequently, the RAN DU and other applications will then start 112 and the system can then run as normal.

The benefit of the above-described process is that it totally eliminates the CSR, which reduces a piece of physical equipment that needs to be placed at the RAN DU server. This lowers the cost of installation (considering the many hundreds of RAN DU servers installed at remote cell sites. This functions to lower the electrical usage of the equipment due to less physical equipment being present. This also saves rack space for other equipment that could potentially be installed in place of the removed CSR.

Figure 4:
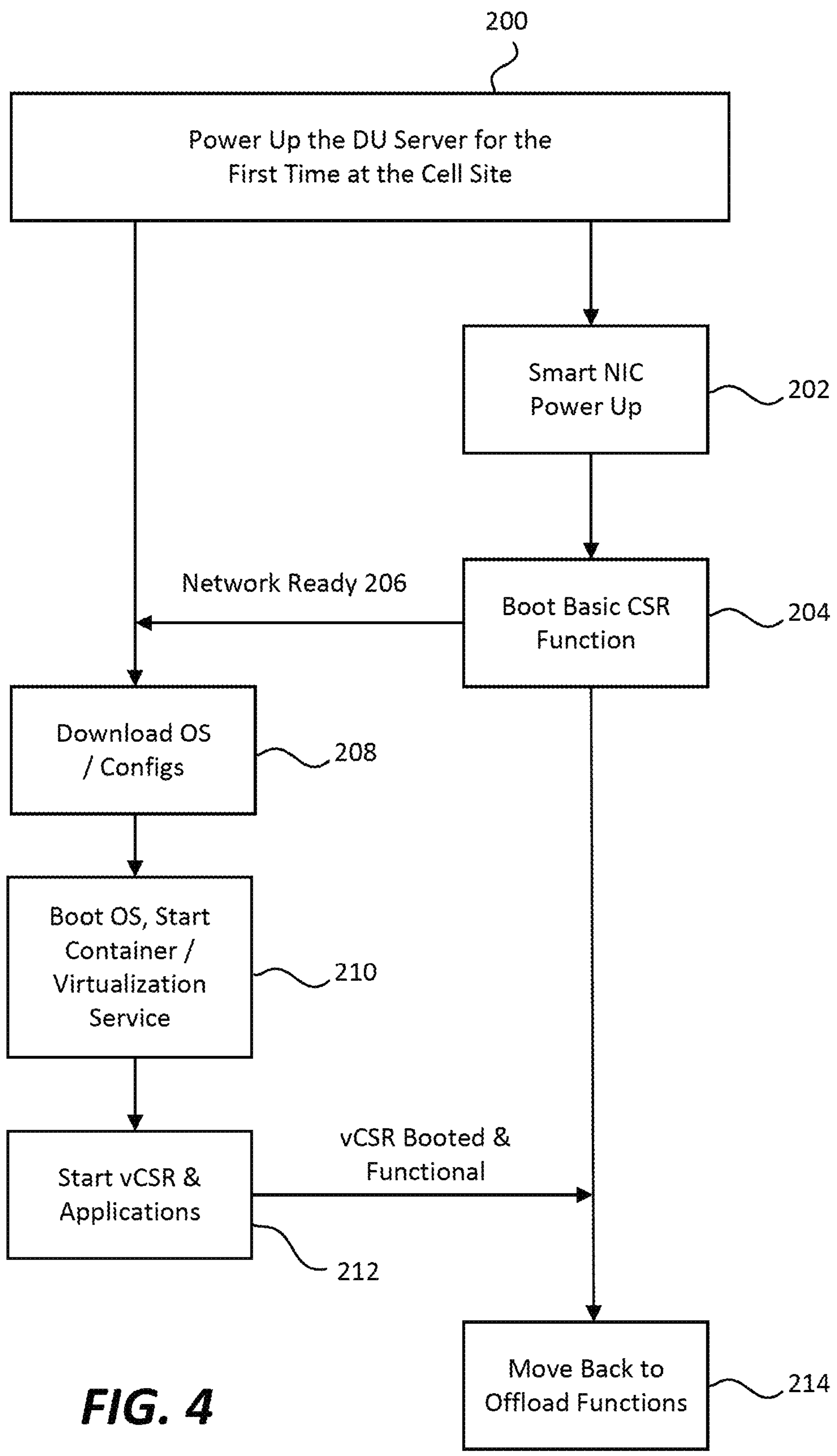
FIG. 4 is a flow diagram of a cell site boot up process using the ZTP RAN server with a vCSR according to FIG. 3.

FIG. 4 is another flow diagram illustrating the boot sequence of the ZTP RAN DU server with a vCSR. It should be noted that FIG. 4 includes some of the same steps as described in connection with FIG. 3 and that some or all of the steps in FIG. 3 may be used in connection with FIG. 4 and vice versa.

Initially the DU server power up at the remote cell site 200. At this point, the NIC will also power up 202 as it is located in the DU server. The NIC will be programmed to boot a basic CSR function 204 allowing the DU server to connect to the network 206 even though no physical CSR is present at the remote cell site location.

At this point, the DU server downloads the BIOS setting, OS Application and configurations allowing the DU server to be configured 208. Once this occurs, the DU server will start container/virtualization services 210. The system then boots the vCSR and applications 212. Finally, the vCSR will configure the NIC to move back to the offload functionality the NIC was originally provided to perform.

Figure 5:
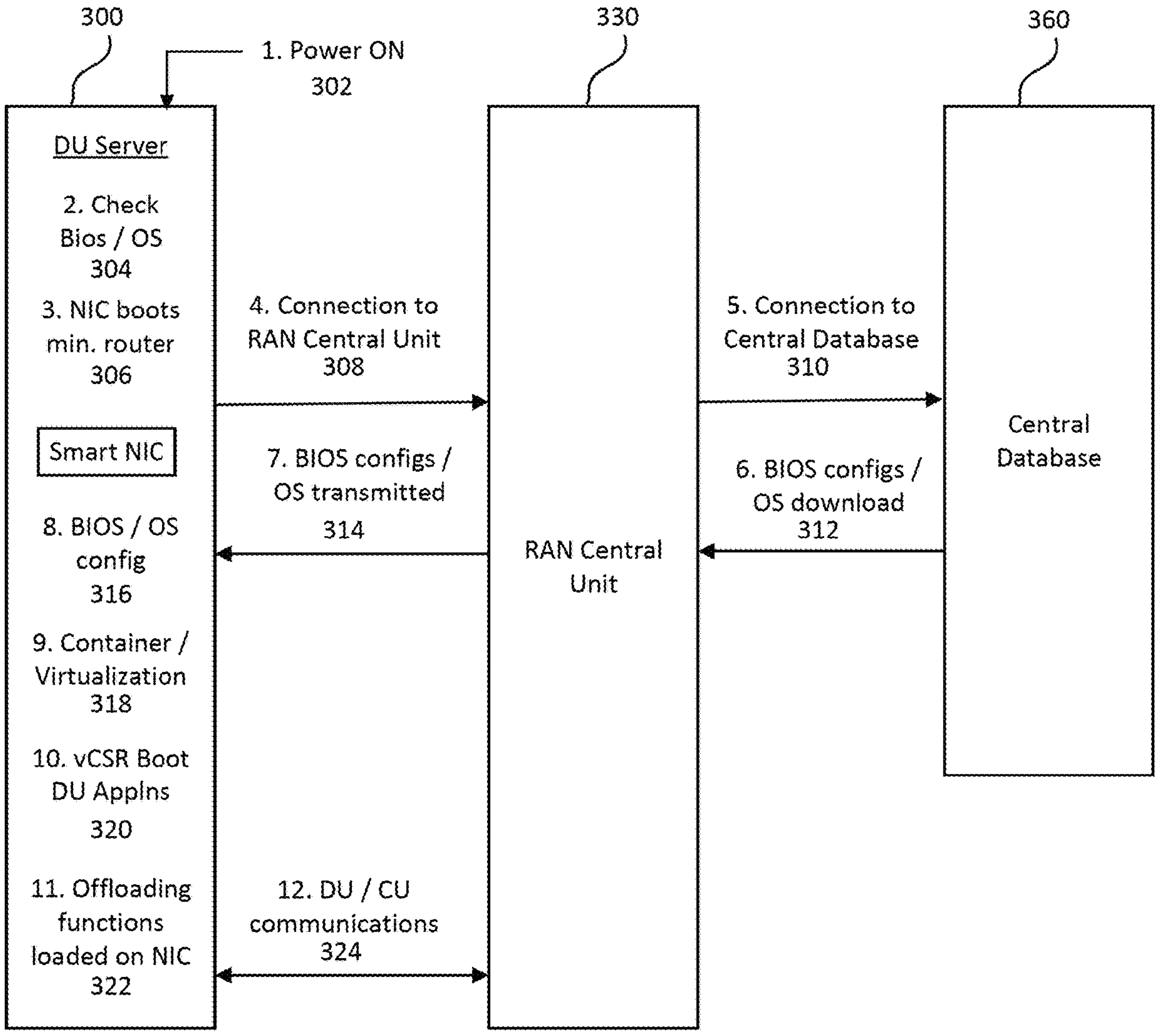
FIG. 5 is a block diagram of the ZTP RAN server with a vCSR according to FIG. 3.

Referring now to FIG. 5, a block diagram is provided that illustrates the data flow between the RAN DU 300, the RAN C300U 330 and the Central Database 360.

The system is powered on 302. The DU server 300 will then check the BIOS/OS 304. Next the NIC boots to function as a basic CSR 306. The NIC allows for the DU server 300 to connect to the RAN CU 308. The RAN CU 330 allows Connection to a Central Database 310. The Central Database 330 then send BIOS configs/OS 312 to RAN CU 330, which in turn transmits the BIOS configs/OS 314 to DU server 300. Once the BIOS configs/OS is received, the DU server is configured 316. Next, container/virtualization 318 of DU server 300 occurs. The vCSR then boots and DU applications run 320. Once the vCSR is up, the NIC is configured to perform offloading functions 322. At this point, the DU server 300 is ready to function normally and DU/CU communication 324 can occur as normal for the operation of the remote cell site.

One of skill in the art will see that the various functions and steps provided may be altered and modified. Likewise, the communications path may be altered without deviating from the invention.

The inventive solution substantially changes the equipment at remote cell sites by virtualizing the routing functions. This provides the following benefits:

1. Full integration and energy efficiency—this is the only system that provides vDU and vCSR CNFs integrated in the same server and optimized for virtual RAN workloads, with fewer cell site devices to power and more date throughput per watt.
2. High Performance—leveraging a high-speed memory interface architecture that maximizes throughput and minimizes packet delay.
3. Automated deployment and swift upgrades—zero-touch provisioning, to bring up thousands of cell sites without truck rolls and compliance with the CNF Continuous Integration and Continuous Delivery (CI/CD) architecture to deliver new features with limited network down-time.
4. Future proof investment—flexible software architecture, hardware agnostic and different network interface card options.
5. Quality of Experience (QoE) for 5G applications at scale—end-to-end QoS slicing for applications with vCSR Segment Routing version 6 (SRv6), and flexible segment definition with programmable Segment ID (SID) binding.
6. Open and programmable solution—based on open-source software with open programmable interfaces (REST API & gNMI) and open configuration models (YANG).
7. Compatibility with Cloud-native Network Functions (CNF) framework—vCSR streaming telemetry allows the use of open-source CNF tools for deployment, orchestration, network analysis and optimization.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A method for booting up a Distributed Unit (DU) server located at a cell site location, the DU server connected to network infrastructure at the cell site location, the method comprising the steps of:

providing a programmable Network Interface Card (NIC) connectable to a network to establish router functionality in the DU server, wherein the NIC is provided for facilitating a connection between the DU server and a remote computer via the network;

the DU server and the NIC are powered up;

the DU server initializing the network infrastructure at the cell site location;

the NIC operating as a basic CSR to provide a connection between the DU server and the remote computer via the network;

the DU server executing software saved on a storage accessible by the DU server, the software comprising a virtual Cell Site Router (vCSR), the vCSR establishing a connection between the DU server and the remote computer;

wherein, after the vCSR has taken over router functions for the DU server, software executes on the DU server reprograming the NIC to provide assisted acceleration for Internet Protocol Security (IPSec) encryption or signal processing offloading by the NIC or both.

2. The method according to claim 1, further comprising the steps of:

the NIC is programmed to function as a basic CSR to facilitate Zero Touch Provisioning (ZTP); and after ZTP is complete, the NIC is reprogrammed to function as an offload engine.

3. The method according to claim 1, wherein when the NIC begins functioning as a router on power up, the DU server downloads Basic Input/Output System (BIOS) configs or Operating System (OS) data for both from the remote computer.

4. The method according to claim 3, wherein once the BIOS configs or the OS data or both are downloaded from the remote computer, the DU server boots up to an operational mode and container/virtualization services are started on the DU server.

5. The method according to claim 4, wherein after virtualization services are started on the DU server, the vCSR and DU applications boot up and reach an operational state after which the NIC is reprogrammed.

6. The method according to claim 5, wherein any subsequent boot ups of the DU server will be via OS bootup.

7. A system for booting up equipment at a cell site location comprising:

a Distributed Unit (DU) server connected to a storage and to network infrastructure at the cell site location;

a programmable Network Interface Card (NIC) connected to the DU server and connectable to a network;

wherein, when the DU server and the NIC are powered up, the DU server initializes the network infrastructure at the cell site location and the NIC establishes a connection between the DU server and a remote computer via the network;

software executing on the DU server comprising a virtual Cell Site Router (vCSR) that establishes a connection between the DU server and the remote computer via the network;

wherein, once the vCSR has taken over router functions for the DU server, the software executing on the DU server reprograms the NIC to provide assisted acceleration for Internet Protocol Security (IPSec) encryption or signal processing offloading by the NIC or both.

8. The system according to claim 7, wherein said NIC facilitates Zero Touch Provisioning (ZTP), and after ZTP is complete, the NIC is reprogrammed to function as an offload engine.

9. The system according to claim 7, wherein when the NIC begins functioning as a basic CSR on power up, the DU server downloads Basic Input/Output System (BIOS) configs or Operating System (OS) data for both from the remote computer.

10. The system according to claim 9, wherein once the BIOS configs or the OS data or both are downloaded from the remote computer, the DU server boots up to an operational mode and container/virtualization services are started on the DU server.

11. The method according to claim 10, wherein after virtualization services are started on the DU server, the vCSR and DU applications boot up and reach an operational state, after which the NIC is reprogrammed.

12. The system according to claim 11, wherein any subsequent boot ups of the DU server will be via OS bootup.

* * * * *